Patented Nov. 26, 1940

2,223,288

UNITED STATES PATENT OFFICE 2,223,288

PROCESS OF MAKING DULL FINISH COATED FABRICS

Robert L. Lester, Newburgh, N. Y., assignor to E. I. du Pont de Nemours & Company, Wilmington, Del., a corporation of Delaware No Drawing. Application July 8, 1937, Serial No. 152,540

1 Claim. (Cl. 91—68)

This invention relates to articles coated with cellulose derivative compositions having a dull or matte finish. More particularly it relates to a process and product capable of producing a dull finish on cellulose nitrate coated fabrics.

In the protective coating composition field there is an extensive demand for a surface possessing a dull or matte finish. For example, in the manufacture of leather substitutes the surface obtained by spreading cellulose derivative compositions on fabrics is often so bright and of such high luster that the product is unsuitable for many uses. Various methods of producing dull finishes have been proposed, but up to the present time no method has been devised which does not have some outstanding disadvantage or peculiar fault which has rendered the same unsatisfactory for general use.

The most common method at present known and used by the art consists in utilizing a finish composition having a high pigment content. After the drying of such compositions a smooth matte finish is obtained. While the appearance of such a finish is usually satisfactory from a surface standpoint, the coating is not generally acceptable to the trade. Highly pigmented finishes have an exaggerated tendency to crock. This crocking is a result of the easy removal of the pigment from the vehicle by abrasion such as normally occurs in the use of the finished material. The removal of the pigment is obviously objectionable particularly on leather substitutes which are used for upholstery purposes and wearing apparel, such as belts, millinery trimmings, etc.

Another way of obtaining a matte finish is to incorporate in the cellulose derivative composition a flattening agent such as aluminum stearate, diatomaceous earth, silica gel, talc, etc. Finishes produced with such compositions are unsatisfactory particularly on non-rigid surfaces since the finish tends to crock and flake when folded or flexed. An additional disadvantage lies in the tendency of the particles of the flattening agent to agglomerate in the vehicle, thereby forming aggregates which produce white spots on the surface to which the composition is applied.

This invention had for an object the provision of dull or matte finishes on materials coated with cellulose derivative compositions. Other objects were the provision of non-crocking, non-pigmented, dull finishes on leather or coated sheets used as leather substitutes, and the provision of a cellulose derivative composition which when applied to a smooth flexible surface deposits a dull film which will not crack or peel upon creasing of the base to which it is applied while imparting a leather-like feel. A general advance in the art and other objects which will appear hereinafter are also contemplated.

It has now been found that a dull finish may be obtained on objects having cellulose derivative coatings by coating the same with an emulsion of water and a cellulose derivative solution in which the water is the internal phase and the cellulose derivative solution is the external phase.

The foregoing objects and related ends are accomplished by the present invention. In the following description and specific examples there are disclosed certain embodiments of the invention as well as details of what is believed to be the best mode for carrying out the invention. The quantities are given in parts by weight throughout the application which discloses various embodiments of the invention.

Example I

A bright finished coated fabric was obtained by coating a woven cotton sateen fabric (1.12 yards per pound per 53 inches width) with a plurality of coats of a composition consisting of:

| | Per cent by weight |
|---|---|
| Cellulose nitrate | 13.62 |
| Ethyl alcohol | 27.00 |
| Ethyl acetate | 17.99 |
| Pigment | 14.18 |
| Castor oil | 27.21 |

In all, 10.5 ounces per yard (based on the non-volatile components) were deposited. After each successive coat the coated fabric was passed through a heated chamber to expel the volatile components. After the above composition had been applied there was applied 1.0 ounce (based on non-volatile components) of a composition consisting of:

| | Per cent by weight |
|---|---|
| Cellulose nitrate | 12.35 |
| Ethyl alcohol | 52.59 |
| Ethyl acetate | 35.06 |

After each coat (sometimes one coat is sufficient) the material was passed through a heated chamber to expel the volatile components. The bright finish coated fabric prepared in this manner was coated with a final surface coat of an emulsion consisting of:

| | Per cent by weight |
|---|---|
| Cellulose nitrate | 9.10 |
| Water | 13.64 |
| Benzene | 40.86 |
| Castor oil | 9.10 |
| Ethyl acetate | 27.30 | by means of a doctor knife so that 1.0 ounce per square yard was deposited. The cellulose nitrate in a 16 ounce concentration had a viscosity characteristic of 10 seconds when determined by the falling ball method (the details of this procedure are given later in the specification). Upon evaporation of the water the resulting product had a very desirable matte finish.

The aforementioned emulsion was prepared by mixing the water and cellulose nitrate (to wet the cellulose nitrate). The benzene, castor oil and ethyl acetate were then added to the water and cellulose nitrate, in the order named. Each component was stirred in before the following was added. As the mixing and agitation was continued the cellulose nitrate was dissolved by the solvent mixture and the water particles dispersed in the form of minute droplets which constituted the internal phase of the emulsion. The cellulose nitrate, solvent mixture and castor oil formed the external phase. As the cellulose nitrate dissolved, the mixture assumed a milk-white appearance, the water forming the discontinuous phase and the remaining components the continuous phase.

Example II

A matte finish emulsion composition consisting of:

| | Per cent by weight |
|---|---|
| Cellulose nitrate | 11.05 |
| Water | 17.70 |
| Castor oil | 17.25 |
| Ethyl acetate | 54.00 | was compounded in the manner described in Example I.

Example III

A dull finish emulsion composition consisting of:

| | Per cent by weight |
|---|---|
| Cellulose nitrate | 7.5 |
| Water | 20.0 |
| Naphtha solvent | 16.25 |
| Castor oil | 11.25 |
| Ethyl acetate | 41.2 |
| Elemi gum | 3.8 | was compounded in the manner described in Example I. The Elemi gum functions to aid in the bonding of the non-volatile components to the base materials. The solvent naphtha was added for diluent purposes.

Example IV

A matte finish emulsion composition consisting of:

| | Per cent |
|---|---|
| Ethyl cellulose | 8.81 |
| Water | 17.64 |
| Castor oil | 7.35 |
| Ethyl acetate | 66.20 | was compounded in the manner described in Example I.

Example V

A matte finish emulsion composition consisting of:

| | Per cent |
|---|---|
| Cellulose aceto butyrate | 8.33 |
| Water | 16.67 |
| Castor oil | 12.50 |
| Ethyl acetate | 62.50 | was compounded in the manner described in Example I.

Example VI

A matte finish emulsion composition consisting of:

| | Per cent |
|---|---|
| Benzyl cellulose | 7.61 |
| Water | 20.22 |
| Castor oil | 11.41 |
| Toluol | 50.65 |
| Ethyl alcohol | 10.11 | was compounded in the manner described in Example I.

Example VII

A matte finish emulsion composition consisting of:

| | Per cent |
|---|---|
| Ethyl cellulose | 3.35 |
| Cellulose nitrate | 5.00 |
| Water | 16.65 |
| Castor oil | 12.50 |
| Ethyl acetate | 62.50 | was compounded in the manner described in Example I. The water sensitivity of ethyl cellulose must be considered when using it as a compounding ingredient.

The emulsions of Examples II, III, IV, V, VI and VII when applied to various surfaces including that described in Example I, produced very desirable matte finishes.

The cellulose nitrate may be the so-called "virgin" cellulose nitrate or reclaimed cellulose nitrate.

The viscosity characteristic of the cellulose derivative may vary over a wide range. The kind of cellulose nitrate used for film or for low viscosity lacquers has viscosity characteristics which make it desirable for the compositions of this invention. The viscosity characteristic is determined by the A. S. T. M. –D301–33 method which is the time required for a steel ball 0.312 inch in diameter and weighing 2.035 grams to fall a distance of 10 inches in a glass cylinder 14 inches in height and 1.0 inch inside diameter and with marks 2 inches from the top and bottom (to mark off the 10 inch distance), filled with a solution consisting of:

| | Per cent by weight |
|---|---|
| Cellulose nitrate | 12.2 |
| Ethyl acetate | 17.5 |
| Denatured alcohol No. 5 | 22.0 |
| Toluol | 48.3 | the temperature of the said solution being $25°\,C. \pm 1°\,C.$

The invention is not limited to the use of cellulose nitrate. Other cellulose derivatives than the cellulose nitrate, cellulose aceto-butyrate, ethyl cellulose and benzyl cellulose of the specific examples such as cellulose formate, cellulose nitro-acetate, cellulose aceto-propionate, and cellulose propionate may be used satisfactorily. In fact, the invention is generally applicable to various cellulose film forming substances soluble in essentially water immiscible solvents having suitable boiling points.

The water in the emulsions of this invention may be replaced to certain extents with the equivalents such as glycerin and the like.

The solvents employed may be any of those well known in the art. Any solvent for the particular cellulose derivative is suitable so long as the solvent is sufficiently immiscible with water. As additional substances of this type, mention may be made of methyl acetate, ethyl acetate, butyl acetate and the like.

The compositions of the type described above have been found to produce dull finishes when the castor oil is replaced by softeners of other types such as blown cotton seed oil, tricresyl phosphate, dibutyl phthalate, polybasic acid-polyhydric alcohol (alkyd) resins of the softener type, and the like. Solvent softeners for cellulose nitrate have been found to give a drier and more even finish than the non-solvent type softener.

The procedure for mixing the components may vary considerably. It is possible to produce an emulsion by adding all of the components of the composition at one time and mixing them together in a suitable type of mixing apparatus. In addition to the procedures described in the specific examples, mention may be made of various other procedures, for example, one in which the cellulose derivative is first dissolved in the organic solvent with a plasticizer and thereafter the water added slowly with continuous agitation. It is also possible to prepare a solution of the cellulose derivative in the organic solvent and add the same to an emulsion of water-in-plasticizer to the saturation point or to add an emulsion of water-in-plasticizer to the saturation point to the cellulose derivative solution with suitable agitation.

The thickness of the emulsion coating to be applied to the article depends upon such factors as the results desired and the method of application. The viscosity of the dull finish coating composition may vary over a wide range. This factor is governed mainly by the method of application. If spraying is employed viscosity should be relatively low. If the coating is carried out by means of the doctor knife blade method, a somewhat higher viscosity is required in order to operate in a commercially practical manner. The matte finish coating composition is usually applied in an amount within the range of ½ to 1½ ounces per square yard. Wider limits may be necessary to accomplish special purposes. It is sometimes desirable to make the sole coating on the fabric from the emulsion and in such a case a somewhat thicker coating of a higher viscosity emulsion has been found desirable. If the percent of water in the emulsion is varied and the ratio of the remaining components held constant, the viscosity of the emulsion increases with increasing water content.

The amount of water which the compositions will tolerate and still produce a satisfactory matte finish depends upon several factors. Varying degrees of dullness are obtained with the composition of Example III by varying the percentage of water within the range 7.6% to 33.0% and holding the ratio of all other components except the water constant. The preferred range for water content of this particular composition is 11.6% to 22.8%. These limits, of course, apply only to Example III. If the ratio of ethyl acetate to the non-aqueous components is altered the limits within which the water content may be varied and yet a satisfactory matte finish obtained is also altered. In general the greater the percentage of ethyl acetate in the composition the greater the quantity of water which may be tolerated.

The viscosity of the composition diminishes with increasing quantities of ethyl acetate and water.

It may be desirable in specific instances to dye the emulsion composition or to add a small amount of pigment thereto. This is a matter easily regulated empirically, as will be clear to those skilled in the art.

The emulsions of this invention may be used to produce dull finishes on both rigid and flexible surfaces, as for example, wood, metal, glass, stoneware, fabrics, coated fabrics, paper, cellulose derivatives, regenerated cellulose, synthetic resins, natural resins, and the like. Instead of utilizing continuous coatings, discontinuous (for example, stenciled) coatings may be employed when desired, as for example, in the production of decorative effects. The various articles enumerated may or may not be coated with well known cellulose derivative compositions such as cellulose nitrate and cellulose acetate before being treated with the emulsions of this invention.

The unusual properties of finished appearance and feel of the material to which the emulsion compositions are applied make the compositions particularly adapted for use as a finish on coated fabrics commonly known in the industry as artificial leather. Particular mention may be made of those types of material which are used for upholstery work, pocketbooks, and the like.

This invention has the outstanding advantage of enabling one to produce a dull finish cellulose derivative coating possessing non-crocking properties. Rubbing and abrasion cause no discoloration of materials which come in contact with products finished in accordance therewith. A further advantage lies in the fact that the compositions herein utilized are economical, easy to prepare and indefinitely stable (they may be allowed to stand for long periods of time without requiring any stirring or agitation just prior to use). The application of the herein described finish to a colored surface produces a dull finish of the same color as the base material, thus obviating the necessity for different colored finishing compositions to match each different colored base material to be coated.

As many apparently widely different embodiments of this invention may be made without departing from the spirit and scope thereof, it is to be understood that I do not limit myself to the specific embodiments thereof except as defined in the appended claim.

I claim:

The process of imparting a dull finish to fabrics which have previously been coated with a pigmented cellulose derivative composition which comprises applying thereto an emulsion comprising about 9.1% of cellulose nitrate, 9.1% of castor oil, 27.3% of ethyl acetate, and 40.86% of benzene as the external phase, and about 13.64% of water as the internal phase, and thereafter depositing the cellulose nitrate in the form of a uniform matte surface by drying.

ROBERT L. LESTER.